(12) United States Patent
Takizawa et al.

(10) Patent No.: US 6,888,594 B2
(45) Date of Patent: May 3, 2005

(54) SUBSTRATE FOR LIQUID CRYSTAL PANEL AND ITS PRODUCTION METHOD, LIQUID CRYSTAL DISPLAY PANEL AND ELECTRONIC APPARATUS

(75) Inventors: Keiji Takizawa, Hotaka-machi (JP); Yoshihiro Otagiri, Natumoto (JP); Tomoyuki Nakano, Toyoshina-machi (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 10/378,269

(22) Filed: Mar. 3, 2003

(65) Prior Publication Data

US 2003/0218706 A1 Nov. 27, 2003

(30) Foreign Application Priority Data

Mar. 5, 2002 (JP) ........................... 2002-059568

(51) Int. Cl.$^7$ ............................. G02F 1/1333
(52) U.S. Cl. .......................... 349/110; 349/44
(58) Field of Search ..................... 349/110, 111, 349/44

(56) References Cited

U.S. PATENT DOCUMENTS 6,204,897 B1 * 3/2001 Colgan et al. ............... 349/12

\* cited by examiner

*Primary Examiner*—James A. Dudek
(74) *Attorney, Agent, or Firm*—Harness, Dickey & Pierce, P.L.C.

(57) ABSTRACT

A first shading region for defining a display region is arranged on a light-transmitting substrate. A cell thickness adjustment layer is arranged on the substrate inside the display region and a second shading region for defining a boundary of a plurality of pixel regions is arranged on the cell thickness adjustment layer. The cell thickness adjustment layer is selected so that the total thickness of the second shading region is not smaller than the total thickness of the first shading region. The cell gap can thus be made uniform throughout the whole display region and non-uniformity of display can be prevented.

17 Claims, 6 Drawing Sheets

FIG. 1

FIG. 2 this invention

FIG. 3A comparative example

FIG. 3B periphery partition position

| stacked structure (frombottom) | | layer thickness design value (example) | layer thickness actual value (example) |
|---|---|---|---|
| first layer | coloring layer 123B | m (1 μm) | m (1 μm) |
| second layer | coloring layer 123R | m (1 μm) | m (1 μm) |
| third layer | coloring layer 123G | m (1 μm) | m (1 μm) |
| fourth layer | overcoat layer 127 | n (2 μm) | n (2 μm) |

FIG. 4A black matrix position

| stacked structure (frombottom) | | layer thickness design value (example) | layer thickness actual value (example) |
|---|---|---|---|
| first layer | reflecting color filter 120R | s (1 μm) | s (1 μm) |
| second layer | coloring layer 122BB | m (1 μm) | m (1 μm) |
| third layer | coloring layer 122BR | m (1 μm) | m/2 (0.5 μm) |
| fourth layer | coloring layer 123BG | m (1 μm) | m/2 (0.5 μm) |
| fifth layer | overcoat layer 127 | n (2 μm) | n/2 (1 μm) |

SUBSTRATE FOR LIQUID CRYSTAL PANEL AND ITS PRODUCTION METHOD, LIQUID CRYSTAL DISPLAY PANEL AND ELECTRONIC APPARATUS

BACKGROUND OF THE INVENTION

1. Technical Field

This invention relates to a semi-transmission/reflection type liquid crystal display apparatus and more particularly to a color filter structure that makes a cell thickness of a liquid crystal display panel uniform.

2. Technical Background of the Invention

A semi-transmission/reflection type liquid crystal display panel that can perform both reflection type display utilizing external light and transmission type display by utilizing illumination light such as backlight is known (also known as a transflective display). This semi-transmission/reflection type liquid crystal display panel includes a reflection layer for reflecting external light inside a panel and allows illumination light from the backlight to transmit through the reflection layer. One of the reflection layers of this kind has a pattern having an opening (slit) of a predetermined proportion for each pixel of the liquid crystal display panel.

When this liquid crystal display panel is fitted to an electronic device such as a mobile telephone or a portable information terminal, it is fitted while a backlight is arranged at the rear portion thereof. In the liquid crystal display panel, external light transmits through the liquid crystal, is then reflected by the reflection layer, again transmits through the liquid crystal and emitted in the daytime or at a bright indoor place, thereby performing reflection type display. On the other hand, the backlight is turned on at night or in a dark place, the rays of light passing through the openings disposed in the reflecting layer from the rays of illumination light emitted from the backlight transmit through the liquid crystal display panel to thereby perform transmission type display.

In the liquid crystal display panel described above, a shading region called "periphery partition" or "frame edge" is formed to define an outer edge of an image display region. More particularly, a shading pattern having a substantially rectangular shape (hereinafter called "periphery partition") is formed at positions corresponding to the outer edge of the image display region on two opposing substrates constituting the liquid crystal display panel. The periphery partition can be formed by laminating coloring layers of R (red), G (green) and B (blue) three colors in the same way as a black matrix formed inside a color filter.

When the periphery partition and the black matrix are formed through the lamination of the R, G and B coloring layers, however, a problem develops that a layer thickness becomes different between the periphery partition and the black matrix. The periphery partition is formed into a width of about 3 to about 4 mm on a plane of the liquid crystal display panel used for a mobile telephone, for example, whereas the black matrix inside the image display region is formed between adjacent pixels and has a width of only about 10 $\mu$m. Therefore, when the periphery partition and the black matrix are formed through lamination of the three R, G and B coloring layers as described above, each coloring layer can be formed to a design value at the periphery partition portion because the width is relatively great. However, it is extremely difficult to form the R, G and B coloring layers to the design values at the black matrix portion because the width is much smaller than at the periphery partition portion. Therefore, upper coloring layers of the laminated R, G and B coloring layers are likely to possess a smaller thickness. As a result, when the same step of forming each coloring layer to the same thickness is carried out, the coloring layers can be formed to a thickness substantially equal to the design values at the periphery partition portion but become smaller than the design values at the black matrix portion. Consequently, the layer thickness of the color filter layer becomes smaller as a whole at the black matrix portion relative to the periphery partition portion.

When the three R, G and B coloring layers are laminated to form the black matrix, the film thickness of the black matrix portion becomes structurally a maximum inside the image display region. However, since the periphery partition portion encompassing the image display region has greater film thickness than the black matrix portion as described above, a difference occurs in the cell gaps between the periphery partitioning portion and the image display portion inside the periphery partitioning portion. More particularly, the cell gap inside the image display portion becomes smaller. Therefore, non-uniformity of display resulting from nonuniformity of the cell gaps may occur particularly in regions inside the image display region close to the periphery partition.

In view of the problems described above, the present invention provides a substrate for a liquid crystal panel that can ensure uniformity of cells at a periphery partition portion and at an image display portion inside the periphery partition portion to prevent non-uniformity of display, its production method, a liquid crystal apparatus and an electronic apparatus.

SUMMARY OF THE INVENTION

According to one aspect of the invention, there is provided a substrate for a liquid crystal panel, including a substrate; a first shading region arranged on the substrate and defining an outer edge of a display region; a cell thickness adjustment layer arranged on the substrate inside the display region; and a second shading region arranged on the cell thickness adjustment layer and defining boundaries of a plurality of pixel regions inside the display region; wherein a thickness of the cell thickness adjustment layer is selected so that a thickness of the second shading region as whole is not smaller than a thickness of the first shading layer as a whole.

The substrate for a liquid crystal panel described above is formed by laminating a plurality of layers on a light transmitting substrate such as glass or a plastic material. A first shading region for defining a display region for displaying images as a liquid crystal display panel is arranged on the substrate. The first shading region is also called a "periphery partition" or a "frame edge". A cell thickness adjustment layer is arranged on the substrate inside the display region. A second shading region for defining boundaries of a plurality of pixel regions is arranged on the cell thickness adjustment layer. The second shading region defines a boundary between an adjacent pair of pixels and is also called a "black matrix". The thickness of the cell thickness adjustment layer is selected so that the whole thickness of the second shading region is not smaller than the whole thickness of the first shading region.

The second shading region such as the black matrix is much thinner than the first shading region such as the periphery partition. Therefore, it is extremely difficult to laminate each of a plurality of layers to a design value when these layers are laminated, and the layer thickness is likely to become smaller than the design value in the second shading region. To cope with this problem, the cell thickness adjustment layer is disposed to raise each layer of the second shading region from the bottom so that the whole thickness is equal to, or greater than, the whole thickness of the first shading region. As a result, the cell gaps can be rendered uniform throughout the entire display region, and non-uniformity of display resulting from non-uniformity of the cell gaps can be prevented.

In the substrate for a liquid crystal panel according to the embodiment described above, the cell thickness adjustment layer is preferably formed of a transparent resin. When the invention is applied to a semi-transmission/reflection type liquid crystal panel, it is necessary to form the cell thickness adjustment layer from a transparent resin to allow the passage of transmitted light.

According to another aspect of the invention, there is provided the substrate for a liquid crystal panel described above, wherein the first shading region includes a lamination of coloring layers of red, blue and green and an overcoat layer, the second shading region includes a lamination of coloring layers of red, blue and green and an overcoat layer, and the coloring layers of red, blue and green and the overcoat layers contained in the first and second shading regions are respectively formed of the same materials. It becomes thus possible to form the corresponding layers in the first and second shading regions by the same method, and to improve production efficiency of a production process.

In the substrate for a liquid crystal panel described above according to still another aspect of the invention, a thickness of the cell thickness adjustment layer can be selected so that a thickness of the second shading region as a whole is greater than a total thickness of the coloring layers and the overcoat layer contained in the first shading region. Consequently, the thickness of the cell thickness adjustment layer can be selected based on the thickness each layer inside the first shading region.

In the substrate for a liquid crystal panel described above according to still another aspect of the invention, the second shading region further includes a color filter layer, and a thickness T of the cell thickness adjustment layer is given by the following equation when a layer thickness of each of the coloring layers in the first and second shading regions is m, a layer thickness of the overcoat layers in the first and second shading regions is n and a layer thickness of the color filter layer in the second shading region is s:

$$T=(3m+n)-(s+2m+n/2).$$

In the substrate for a liquid crystal panel described above according to still another aspect of the invention, the cell thickness adjustment layer is preferably formed of the same transparent resin as that of the overcoat layer. Consequently, the cell thickness adjustment layer and the overcoat layer can be formed by use of the same production apparatus and the same material, and efficiency of a production process can be improved.

It is possible to constitute a liquid crystal display panel including the substrate for a liquid crystal panel described above and to constitute an electronic apparatus having the liquid crystal display panel as a display portion.

According to still another aspect of the invention, there is provided a method of producing a substrate for a liquid crystal panel, comprising a first step of forming a first shading region defining an outer edge of a display region on a substrate; a second step of forming a cell thickness adjustment layer on the substrate inside the display region; and a third step of forming a second shading region defining boundaries of a plurality of pixel regions inside the display region on the cell thickness adjustment layer; wherein a thickness of the cell thickness adjustment layer is selected so that a thickness of the second shading region as a whole is not smaller than a thickness of the first shading region as a whole.

The production method described above can produce the substrate for a liquid crystal panel described above.

DETAILED DESCRIPTION OF THE PREFERRED EMBODIMENTS

A preferred embodiment of the invention will be explained with reference to the drawings.

Liquid Crystal Display Panel

Figure 1:
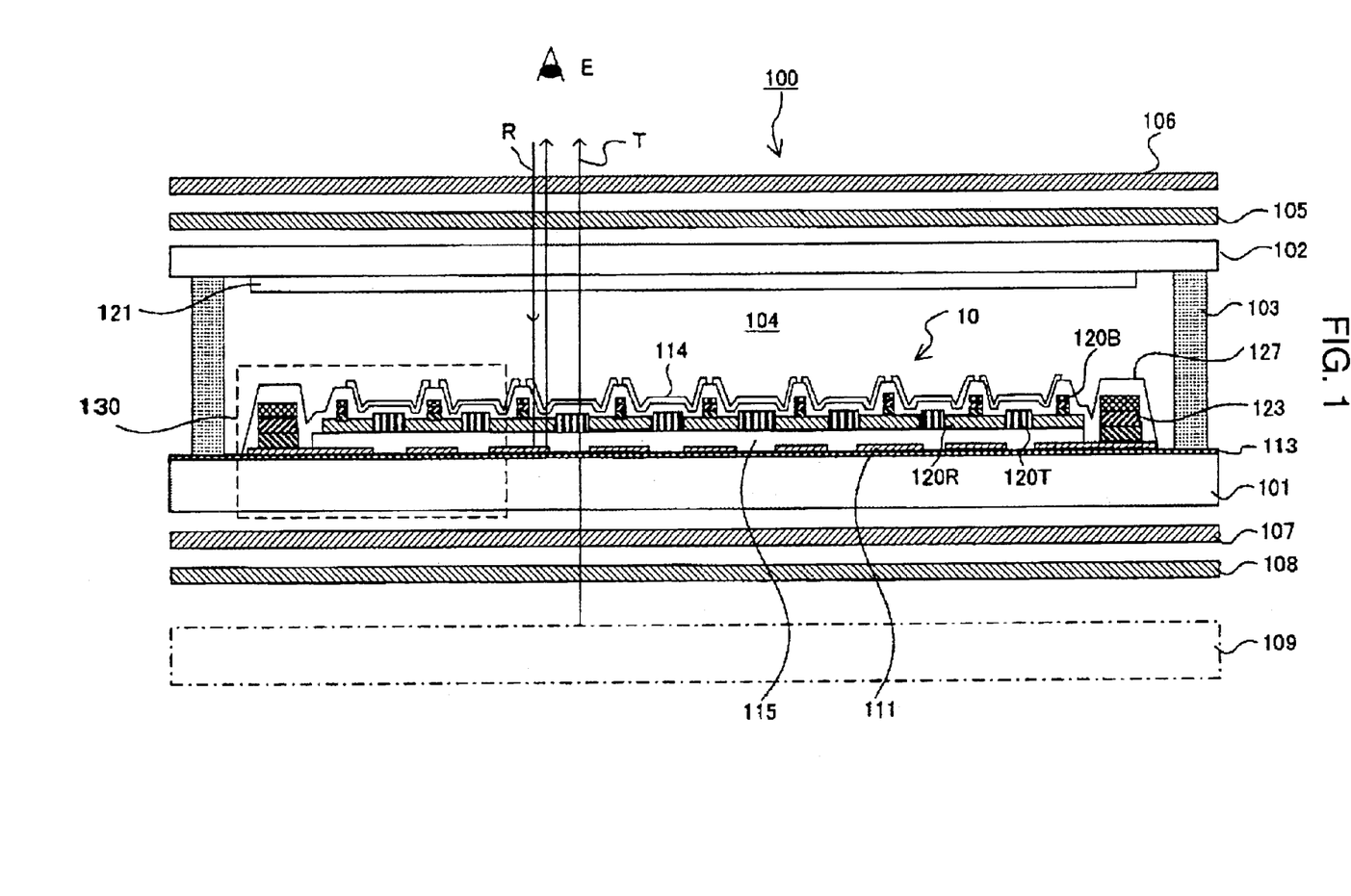
FIG. 1 is a sectional view showing a structure of a liquid crystal display panel according to an embodiment of the invention.

A liquid crystal display panel according to an embodiment of the invention will be explained first. FIG. 1 is a sectional view of a semi-transmission type liquid crystal display panel to which the invention is applied.

Referring to FIG. 1, a liquid crystal display panel 100 includes substrates 101 and 102 made of a glass or plastic material that are bonded to each other through a sealing material 103, and a liquid crystal 104 injected between both substrates. A phase difference plate 105 and, a polarizing plate 106 are serially arranged on an outer surface of the substrate 102. A phase difference plate 107 and a polarizing plate 108 are serially arranged on an outer surface of the substrate 101. A backlight 109 for emitting illumination light for transmission type display is arranged below the polarizing plate 108.

The substrate 101 constitutes a color filter substrate 10. A transparent resin scattering layer 113 formed of an acrylic resin, for example, is formed on the substrate 101. The resin scattering layer 113 can be produced through the steps of forming a light-transmitting resin layer of an acrylic resin, for example, on a surface of a glass or plastic substrate, and then forming a large number of very fine concavo-convex structures on its surface.

A reflecting layer 111 made of an aluminum alloy or a silver alloy is partially formed on the resin scattering layer 113. The region where the reflecting layer 111 is formed is the region to be used for reflection type display (hereinafter may be referred to as "reflecting region"). The surface of the reflecting layer 111 has a concavo-convex shape reflecting the concavo-convex structures of the resin scattering layer 113. When reflection type display is performed by utilizing rays of external light, the rays of external light are reflected while being appropriately scattered by the concavo-convex shape. As a consequence, reflected rays of light can be rendered uniform, and a wide visual field angle can be secured.

Figure 2:
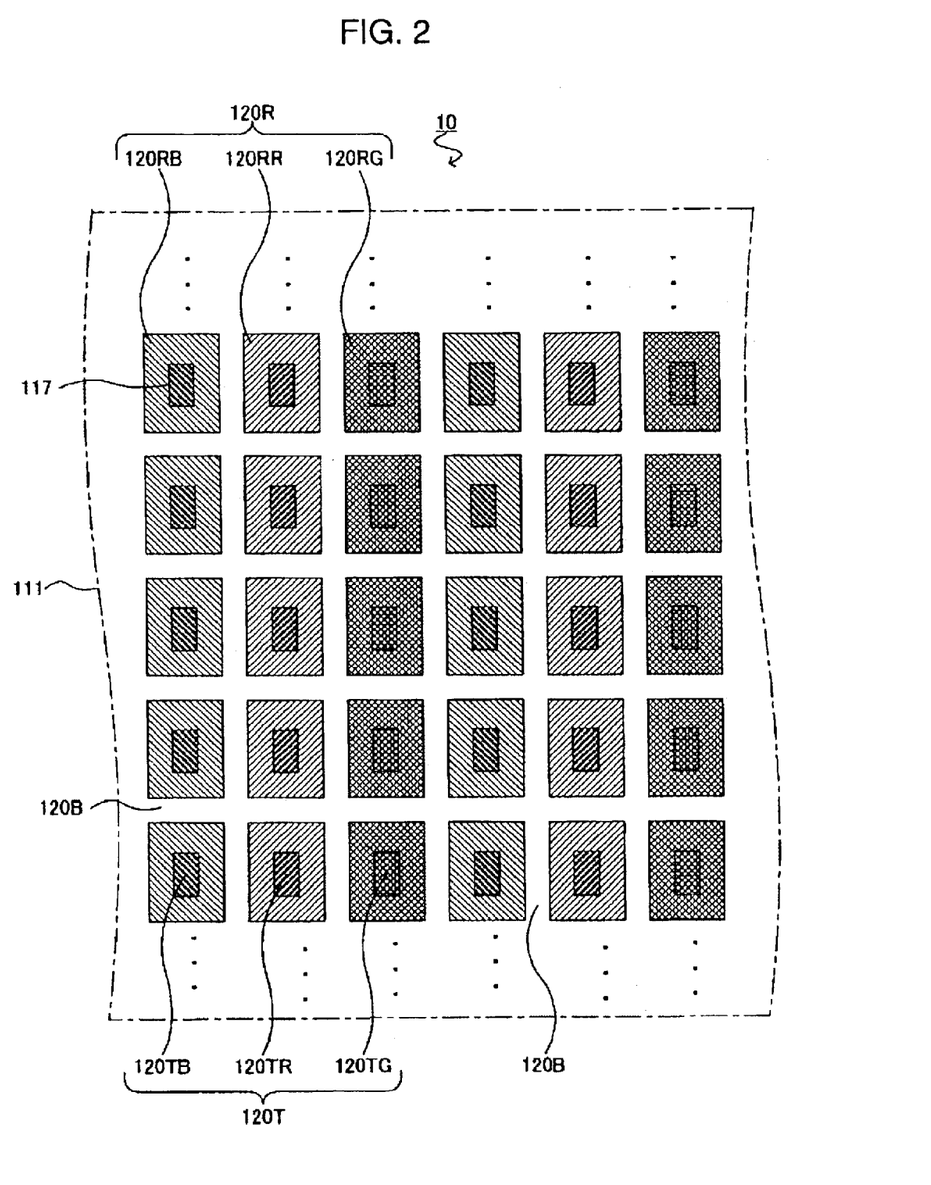
FIG. 2 is a plan view showing a color filter structure used for the liquid crystal display panel shown in FIG. 1.

Openings 117 are formed in a predetermined interval on the reflecting layer 111 (see FIG. 2). In other words, the reflecting layer 111 is not formed at the portions of the openings 117, and the openings 117 serve as transmitting regions. The regions where the reflecting layer 111 is formed, that is, the regions other than the openings 117, are reflecting regions.

A cell thickness adjustment layer 115 made of a photosensitive acryl resin is formed over the reflecting layer 111 in the reflecting regions and over the resin scattering layer 113 in the transmitting regions. The cell thickness adjustment layer 115 plays the role of raising a color filter layer formed thereon from the bottom and adjusting the cell thickness between a periphery partition region and an image display region. Incidentally, a suitable thickness of the cell thickness adjustment layer 115 will be described elsewhere.

A reflecting color filter portion 120R of each color is formed on the cell thickness adjustment layer 115 in the reflecting region. In the transmitting region, on the other hand, a transmitting color filter portion 120T of each color is formed similarly on the cell thickness adjustment layer 115. The reflecting color filter 120R and the transmitting color filter 120T are separately formed so that the display colors can be individually adjusted during transmission display and during reflection display.

In FIG. 1, the reflecting color filter 120R and the transmitting color filter 120T represent the color filter of each of R, G and B for the convenience of illustration. In practice, however, each reflecting color filter 120R and transmitting color filter 120T includes coloring layers of R, G and B as shown in FIG. 2. In other words, a red (R) coloring layer 120RR, a green (G) coloring layer 120RG and a blue (B) coloring layer 120RB are serially arranged to form the reflecting color filter 120R. Similarly, a red (R) coloring layer 120TR, a green (G) coloring layer 120TG and a blue (B) coloring layer 120TB are serially arranged to form the transmitting color filter 120T.

Black matrices 120B (see FIG. 2) are formed at boundaries among the reflecting color filters 120TR, 120TG and 120TB of each color and the transmitting color filters 120RR, 120RG and 120RB. The coloring layers of the three colors R, G and B constituting the transmitting color filter 120T are laminated to form the black matrix 120B as shown in FIG. 1. The R, G and B coloring layers of the transmitting color filter are used but not those of the reflecting color filter for the following reason. The transmitting color filter is generally designed so as to have a higher color density than the reflecting color filter. Therefore, when the three colors are superposed, a black matrix having a higher density and higher shading performance can be formed.

An overcoat layer 127 is formed so as to cover the reflecting color filter portion 120R and the transmitting color filter portion 120T. This overcoat layer 127 is to protect the color filters 120R and 120T from corrosion and contamination by chemicals during the production process of the liquid crystal display panel. Incidentally, the liquid crystal display panel 100 in FIG. 1 employs a so-called "multi-gap structure". The multi-gap structure changes the thickness of the overcoat layer 127 between the transmitting region and the reflecting region to optimize the cell thickness, and improves display performance in both the transmission display mode and the reflection display mode.

A transparent electrode 114 made of a transparent conductor such as ITO (indium tin oxide) is formed on the surface of the overcoat layer 127. In this embodiment, a plurality of transparent electrodes 114 are aligned in parallel in a stripe shape. The transparent electrodes 114 extend in a direction crossing transparent electrodes 121 similarly formed into a stripe shape. Each constituent portion of the liquid crystal display panel 100 defined inside the transparent electrodes 114 and the transparent electrodes 121 (the portion inside the crossing region in the reflecting layer 111, the color filter 120, the transparent electrode 114, the liquid crystal 104 and the transparent electrode 121) constitutes a pixel.

An orientation film is formed, whenever necessary, on the transparent electrodes 114 on the substrate 101 and on the transparent electrodes 121 on the substrate 102.

When reflection type display is performed in this liquid crystal panel 100, the rays of external light incident into the region where the reflecting layer 111 is formed travel along the route R shown in FIG. 1, are reflected by the reflecting layer 111 and are recognized by an observer E. When transmission type display is performed, on the other hand, the rays of illumination light outgoing from the backlight 109 travel along the route T shown in FIG. 1 and are observed by the observer E.

Incidentally, the arrangement of each color layer of the color filter in the invention is not particularly limited to the one shown in FIG. 2. In other words, it is possible to employ various kinds of arrangements such as a stripe arrangement, a delta arrangement and a diagonal arrangement. Though the transmitting color filter and the reflecting color filter are independently formed by use of different materials in the embodiment described above, they can be formed into a single color filter by use of the same material. Such a construction can also be applied to a color filter of a type in which the thickness of the color filters is different between the transmitting region and the reflecting region.

Cell Thickness Adjustment Layer

Figure 3A:
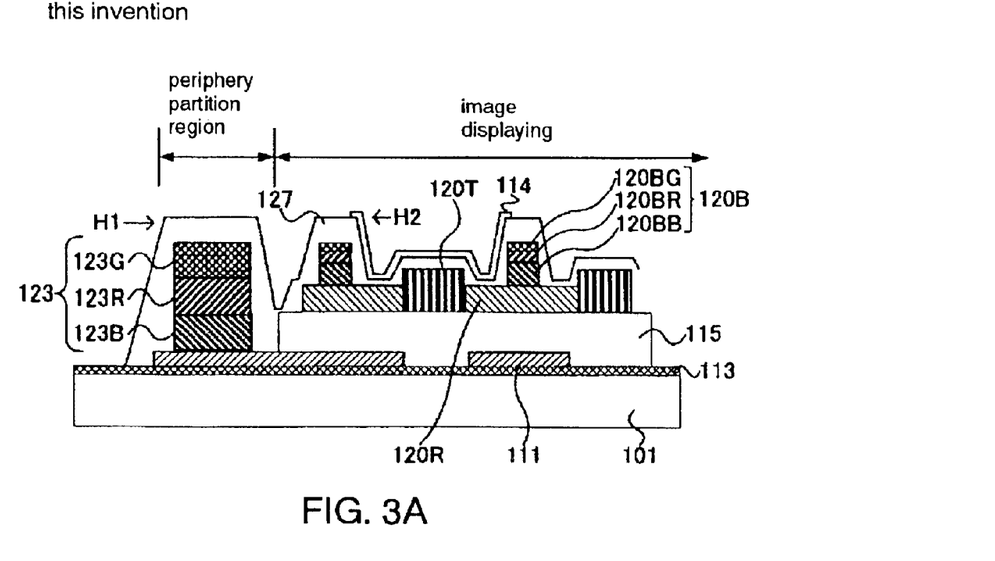
FIG. 3 is a partial enlarged sectional view of the liquid crystal display panel and a sectional view showing a structure of a liquid crystal display panel when a cell thickness adjustment portion is not disposed as a comparative example.

Next, a cell thickness adjustment layer will be explained in detail. FIG. 3A is an enlarged view of the portion 130 indicated by the broken line in FIG. 1. As shown in this drawing, a resin scattering layer 113 is formed on the substrate 101, and the reflecting layer 111 is formed on the resin scattering layer 113 in the reflecting region.

In the image display region, on the other hand, the cell thickness adjusting layer 115 is formed on the resin scattering layer 113 and on the reflecting layer 111, and the transmitting color filter 120T and the reflecting color filter 120R are formed on the cell thickness adjustment layer 115. The black matrix 120B is formed on the reflecting color filter 120R by the lamination of the coloring layers (120BB, 120BR and 120BG) R, G and B three colors. A peripheral partition 123 is formed on the reflecting layer 111 in the periphery partition region by the lamination of coloring layers 123B, 123R and 123G.

The overcoat layer 127 is formed so as to cover the periphery partition region and the image displaying region, and the transparent electrode 114 is further formed in each pixel region inside the image display region.

As can be appreciated from FIG. 3A, the height H1 of the portion of the periphery partition 123 (more particularly, the height of the overcoat layer 127 covering the periphery partition 123) is substantially coincident with the height H2 of the highest point inside the image display region, that is, the height of the portion of the black material 120B (more particularly, the height of the overcoat layer 127 covering the black matrix 120B) in the invention because the cell thickness adjustment layer 115 is disposed. As a consequence, the cell gap of the periphery partition region can be brought into substantial conformity with the cell gap of the image display region.

Figure 3B:
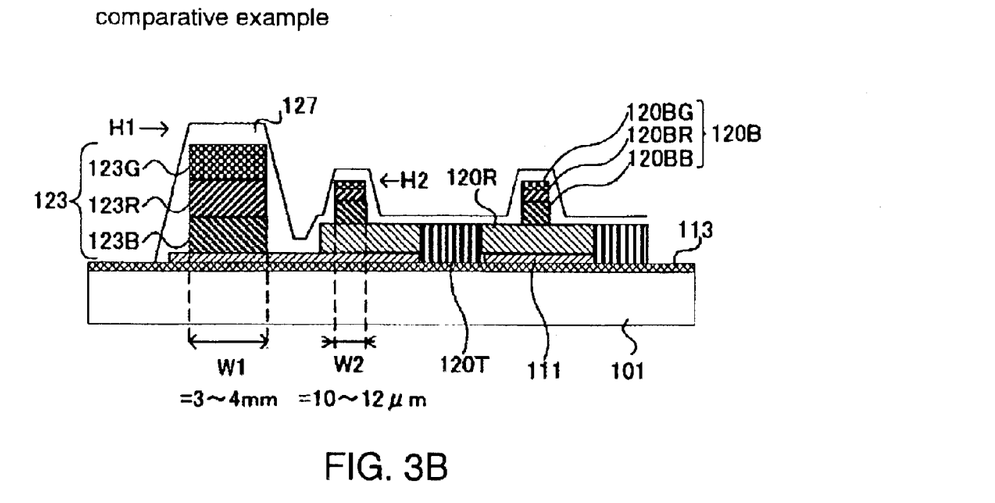

FIG. 3B shows an example of a color filter substrate not having the cell thickness adjustment layer for comparison with the invention. The example shown in FIG. 3B has the same construction as the stacked construction shown in FIG. 3A with the exception that the cell thickness adjustment layer 115 is not disposed therein. In other words, the reflecting color filter 120R is formed immediately above the reflecting layer 111 in the reflecting region, and the transmitting color filter 120T is formed immediately above the resin scattering layer 113 in the transmitting region.

When the cell thickness adjustment layer is not included, the height H2 of the portion of the black matrix 120B inside the image display region is lower than the height H1 of the highest point of the periphery partition region as can be clearly seen in FIG. 3B.

To cope with the problem that the height of the image display region is lower than the height of the periphery partition region as shown in FIG. 3B, a method is devised that omits the coloring layer 123G of the green color constituting the periphery partition 123 in FIG. 3B. The reason why the green coloring layer among the R, G and B three colors is omitted is because omission of the green color provides the smallest influences when any one of the R, G and B three colors is omitted from the aspect of the spectral characteristics of the color filter, and even when the green color is omitted, the shading property can be acquired to the extent such that the partitioning function can be somehow secured. The difference of the height becomes small when the green coloring layer 123G is omitted, but it is still difficult to bring the height of the image display region into conformity with that of the periphery partition region.

Spherical spacers, not shown, are disposed in the region where the liquid crystal 104 shown in FIG. 1 is injected. The spacers so dispersed are supported at the highest point of the color filter substrate 10 and play the role of making the cell gap as the spacing between the substrates 101 and 102 uniform. Since the spacers dispersed between the substrates 101 and 102 have the same diameter, the height of the highest point of the color filter substrate 10 is different between the periphery partition region and the image display region as shown in FIG. 3B. When the height is different, the support of the spacers by the color filter is likely to be more deficient in the image display region than in the periphery partition region. As a consequence, the phenomenon in which the cell gap becomes smaller in the image display region than in the periphery partition region takes place.

In other words, when the liquid crystal display panel 100 is viewed from the transverse direction, the central portion corresponding to the image display region is somewhat recessed in comparison with the peripheral portion corresponding to the periphery partition region, and non-uniformity of display resulting from non-uniformity of the cell gaps occurs in the image display region.

In view of this fact, the invention forms the cell thickness adjustment layer 115 to bring the highest point H2 of the image display region into substantial conformity with the highest point H1 of the periphery partition region and prevents non-uniformity of display resulting from non-uniformity of the cell gaps.

It is empirically known that even when the cell gap of the image display region is not coincident with the cell gap of the periphery partition region, non-uniformity of display is more difficult to occur in the case where the cell gap of the image display region is somewhat greater than the cell gap of the periphery partition region (that is, when the center of the liquid crystal display panel somewhat swells when viewed from the transverse direction) than in the case where the cell gap of the image display region is smaller than the cell gap of the periphery partition region, and display quality of the image is higher, too. Basically, therefore, it is preferred to select the thickness of the cell thickness adjustment layer 115 so that the cell gap of the image display region is not smaller than the cell gap of the periphery partition region or in other words, the highest point H2 of the image display region is not lower than the highest point H1 of the periphery partition region. Notwithstanding, the thickness of the cell thickness adjustment layer 115 is most preferably selected so that both of the cell gaps coincide with each other.

Next, the thickness of the cell thickness adjustment layer 115 will be examined. It will be assumed that the cell thickness adjustment layer is not disposed as shown in FIG. 3B. When the lamination structure is compared at the position of the periphery partition 123 and at the position of the black matrix 120B of the image displaying region, the substrate 101, the resin scattering layer 113 and the reflecting layer 111 have the same construction, and the difference in the height basically does not occur.

Figure 4A:
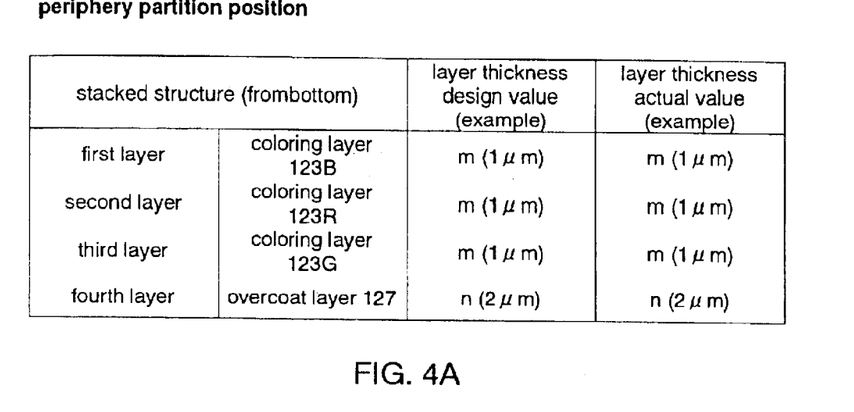
FIG. 4 is a graph numerically showing a laminated structure at a position of a periphery partition and at a position of a black matrix inside an image display region in the embodiment of the invention.
Figure 4B:
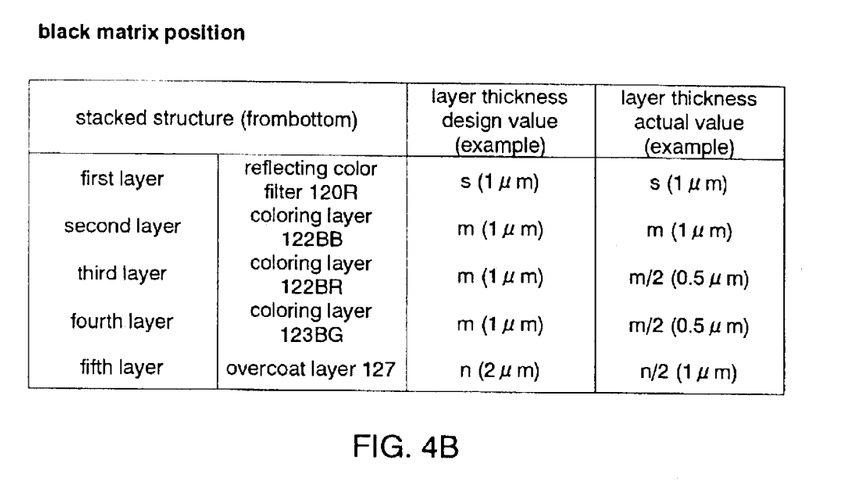

FIGS. 4A and 4B tabulate the stacked layer structures at the position of the periphery partition 123 and at the position of the black matrix 120B of the image display region, and the thickness of each layer. The laminated layer structure at the periphery partition includes the coloring layer 123B, the coloring layer 123R, the coloring layer 123G and the overcoat layer 127 from below in that order. It will be assumed that the total design thickness of the three coloring layers 123B, 123R and 123G is m (1 μm, for example) and the design thickness of the overcoat layer 127 is n (2 μm, for example). In this case, when each layer is formed in accordance with the design thickness, each layer can be formed substantially to the design thickness as shown in FIG. 4A.

On the other hand, the stacked layer structure at the position of the black matrix 120B of the image display region includes the reflecting color filter layer 120R, the coloring layer 120BB, the coloring layer 120 BR, the coloring layer 120BG and the overcoat layer 127 from below in that order as shown in FIG. 3B and FIG. 4B. It will be assumed that the design thickness of each layer is s (1 μm, for example) for the reflecting color filter layer 120, m (1 μm, for example) for each coloring layer 120BB, 120BR, 120BG forming the black matrix 120B and n (2 μm, for example) for the overcoat layer 127. When each layer is practically formed in accordance with the design thickness, the third layer and the layers above the third layer cannot be formed to the design thickness but become about ½ of the design thickness as shown in FIG. 4B.

This phenomenon results from the small width of the black matrix 120B. FIG. 3B shows an example of the width of the periphery partition 123 and the width of the black matrix 120B. Whereas the width W1 of the periphery partition 123 is from about 3 to about 4 mm, the width W2 of the black matrix 120B is from about 10 to about 12 μm.

Since the width of the periphery partition 123 is relatively great, each layer can be formed to the design value. Since the width of the black matrix 120B is small, however, it becomes difficult to form each layer to the design thickness as the layers are stacked. (Practically, it is believed that the stacked layer structures at the position of the black matrix tapers off upward towards the upper layers when viewed in the section such as in FIG. 3B).

Therefore, the layer thickness of the cell thickness adjustment layer 115 may well be decided in consideration of the layer thickness practically formed at the position of the black matrix 120B. It can be seen from the example shown in FIG. 4 that the layers from above the third layer are formed to the thickness of only about ½ of the design thickness at the position of the black matrix 120B. Therefore, the layer thickness of the cell thickness adjustment layer 115 can be decided by regarding that the layers above the third or fourth layers are practically formed to the thickness of ½ of the design thickness.

In the example shown in FIG. 4, the total layer thickness T1 of the first to fourth layers practically formed is T1=3$m$+$n$ (about 5 $\mu$m) at the position of the periphery partition 123. On the other hand, the total layer thickness T2 of the first to fifth layers practically formed is T2=$s$+$m$+2$xm$/2+$n$/2=$s$+2$m$+$n$/2 (about 4 $\mu$m) at the position of the black matrix 120B. Therefore, the thickness T of the cell thickness adjustment layer 115 is given by T=T1−T2=(3$m$+$n$)−($s$+2$m$+$n$/2).

Therefore, when the cell thickness adjustment layer 115 having a thickness of about 1 $\mu$m is formed in the example shown in FIG. 4, the highest point of the periphery partition position is substantially coincident with the highest point of the black matrix position. Since the cell thickness adjustment layer 115 having an appropriate thickness can thus be formed, it becomes possible to make the cell gaps uniform both in the periphery partition region and the image display region and to prevent the reduction of image quality such as non-uniformity of display resulting from non-uniformity of the cell gaps.

Production Method

Next, a production method of the liquid crystal display panel 100 described above will be explained. First, a production method of the color filter substrate 10 shown in FIG. 1 will be explained with reference to FIGS. 1 and 3A.

The resin scattering layer 113 is formed on the surface of the substrate 101. The resin scattering layer 113 can be produced by, for example, the steps of forming the light-transmitting resin layer from an acrylic resin, for example, on the substrate surface of glass or the plastic as already described, and then forming a large number of fine concavo-convex structures on its surface. Other production methods may be employed to produce the resin scattering layer 113, if desired.

Next, a metal film such as aluminum, the aluminum alloy or the silver alloy is formed by vacuum deposition or sputtering, and is patterned by photolithography to form the reflecting layer 111. In this instance, the reflecting layer 111 is formed in only the reflecting region.

The cell thickness adjustment layer 115 is then formed from a transparent, photosensitive acrylic resin. As can be seen from FIG. 3A, the cell thickness adjusting layer 115 is preferably formed of a transparent material having low wavelength dependence because the rays of illumination light from the backlight 109 transmit through the cell thickness adjustment layer when transmission display is made. When the cell thickness adjustment layer 115 is formed of the same materials as that of the overcoat layer 127, the production process can be simplified.

Next, a colored photosensitive resin (photosensitive resist) prepared by dispersing a pigment or dye exhibiting predetermined hue is applied, and exposure and development are made into a predetermined pattern for patterning. As a result, the transmitting color filter 120T is formed on the cell thickness adjustment layer 115 in the transmission region, and the reflecting color filter 120R is formed in the reflecting region.

Next, the black matrix 120B is formed on the transmitting color filter 120R and the periphery partition 123 is formed preferably simultaneously on the reflecting layer 111 in the periphery partition region. The periphery partition 123 is formed of the same material as that of the coloring layer of each of the R, G and B colors constituting the black material 120. In other words, the coloring layer 123B of the periphery partition 123 and the coloring layer 120BB of the black matrix 120B are formed of the same material, the coloring layer 123R of the periphery partition 123 and the coloring layer 120BR of the black material 120B are formed of the same material, and the coloring layer 123G of the periphery partition 123 and the coloring layer 120BG of the black matrix 120B are formed of the same material.

Next, the overcoat layer 127 of the acrylic resin is formed on the entire region inclusive of the periphery partition 123 and the black matrix 120B. Further, the transparent electrode 114 is formed in each pixel region inside the image display region. In this way the color filter substrate 10 is produced.

Incidentally, each coloring layer 123B to 123R and each coloring layer 120BB to 120BG of the black matrix 120B at the position of the periphery partition 123, the overcoat layer 127 at the periphery partition 123 and the overcoat layer 127 at the position of the black matrix 120B are formed to the same design thickness. In practice, however, each layer is formed substantially to the design thickness at the periphery partition 123 but is not formed to the design thickness on the black matrix 120B as described above. Since the cell thickness adjustment layer 115 is disposed in the invention, each layer at the position of the black matrix 120B is raised so that it is substantially coincident with the layer thickness at the position of the periphery partition.

Figure 5:
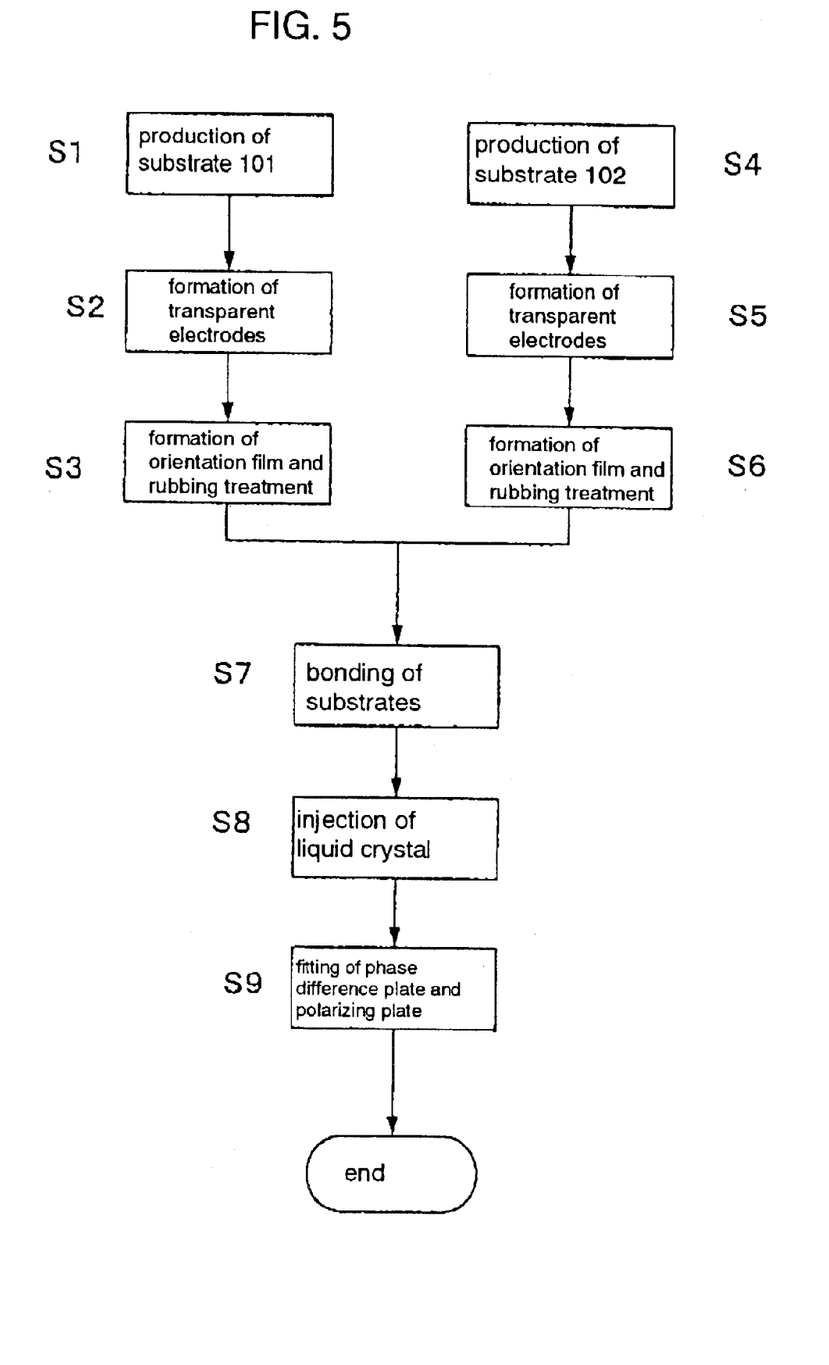
FIG. 5 is a flowchart showing a production method of a liquid crystal display panel according to the embodiment of the invention.

Next, a production method of the liquid crystal display panel 100 shown in FIG. 1 by use of the color filter substrate 10 so obtained will be explained with reference to FIG. 5. FIG. 5 is a flowchart showing a production process of the display panel 100.

The substrate 101 from which the color filter substrate 10 having the cell thickness adjustment layer 115 is formed is produced by the method described above (Step S1). A transparent conductor is deposited to the overcoat layer 127 by sputtering and is patterned by photolithography to form the transparent electrodes 114 (Step S2). An orientation film of a polyimide resin is formed on the transparent electrodes 114 and rubbing treatment is applied (Step S3).

On the other hand, the substrate 102 on the opposite side is fabricated (Step S4) and the transparent electrodes 121 are formed in the same way (Step S5). The orientation film is formed on the transparent electrodes 121 and rubbing treatment is applied (Step S6).

The substrate 101 and the substrate 102 are bonded to each other through the sealing material 103 to yield a panel structure (Step S7). The substrates 101 and 102 are bonded in such a fashion as to keep predetermined spacing by the spacers not shown in the drawing.

The liquid crystal 104 is injected from the opening of the sealing material 103, not shown, and the opening is sealed by use of a sealant such as an UV-curing resin (Step S8). After the primary panel structure is thus completed, the phase difference plate and the polarizing plate described above are fitted to the outer surface of the panel structure by means such as bonding, whenever necessary (Step S9), giving the liquid crystal panel 100 shown in FIG. 1.

Electronic Apparatus

An example of an electronic apparatus to which the liquid crystal display panel of the invention can be applied will be explained with reference to FIG. 6.

Figure 6A:
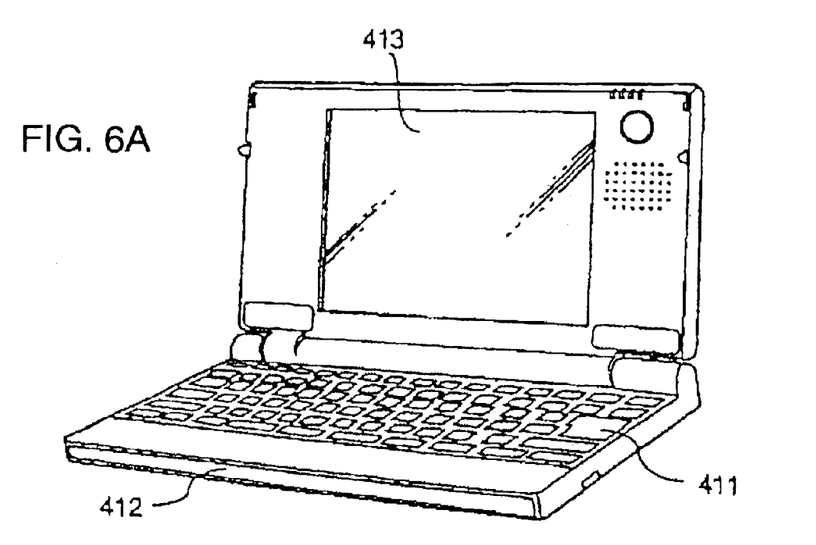
FIG. 6 shows an example of an electronic apparatus to which the liquid crystal display panel according to the invention is applied.

The explanation will be given on an example where the liquid crystal display panel of the invention is applied to a display portion of a portable personal computer (a so-called "notebook type personal computer"). FIG. 6A is a perspective view showing the construction of this personal computer. As shown in the drawing, the personal computer 41 includes a main body portion 412 having a keyboard 411 and a display portion 413 having the liquid crystal display panel according to the invention.

Figure 6B:
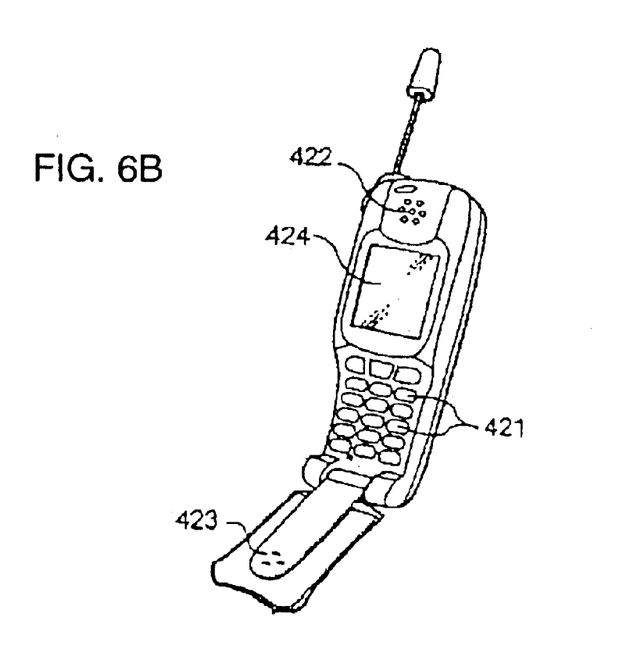

Next, the explanation will be given on an example where the liquid crystal display panel of the invention is applied to a display portion of a mobile telephone. FIG. 6B is a perspective view showing a construction of this mobile telephone. As shown in the drawing, the mobile telephone 42 includes a plurality of operation buttons 421, a reception port 422, a speech port 423 and a display portion 424 having the liquid crystal display panel according to the invention.

Besides the personal computer shown in FIG. 6A and the mobile telephone set shown in FIG. 6B, the electronic apparatuses to which the liquid crystal display panel according to the invention can be applied include a liquid crystal television set, a view-finder type/monitor or a direct view type video tape recorder, a car navigation apparatus, a pager, an electronic personal organizer, an electronic calculator, a word processor, a work station, a television telephone set, a POS terminal and a digital/still camera.

Modified Embodiment

The color filter substrate and the liquid crystal display panel described above are not limited to the examples described above but can be changed or modified in various ways without departing from the scope of the invention.

The embodiment described above represents the liquid crystal display panel employing the so-called "multi-gap structure" in which the layer thickness of the overcoat layer is different between the transmission region and the reflection region. However, the invention can be applied also to a liquid crystal display panel having a construction in which the overcoat layer is formed to a uniform thickness in both transmission region and reflection region.

The color filter shown in FIG. 2 has the construction that defines the transmission region as the opening inside the reflection region. However, this construction is merely illustrative, and it is also possible to employ a construction in which rectangular reflecting color filter portions and transmitting color filter portions are alternately formed adjacent to one another.

The entire disclosure of Japanese Patent Application No. 2002-059568 filed Mar. 5, 2002 is incorporated by reference herein.

What is claimed is:

1. A substrate for a liquid crystal panel comprising:
a substrate;
a first shading region arranged on said substrate and defining an outer edge of a display region;
a cell thickness adjustment layer arranged on said substrate inside said display region; and
a second shading region arranged on said cell thickness adjustment layer and defining boundaries of a plurality of pixel regions inside said display region;
wherein a thickness of said cell thickness adjustment layer is selected so that a height of said second shading region as a whole is not less than a height of said first shading layer as a whole;
wherein said first shading region includes a superposition of coloring layers of a plurality of colors and an overcoat layer; and
wherein said second shading region includes a superposition of coloring layers of a plurality of colors and an overcoat layer.

2. The substrate for a liquid crystal panel as defined in claim 1, wherein said cell thickness adjustment layer further comprises a transparent resin.

3. The substrate for a liquid crystal panel as defined in claim 1, wherein
said coloring layers of said plurality of colors and said overcoat layers contained in said first and second shading regions are respectively formed of the same materials.

4. The substrate for a liquid crystal panel as defined in claim 3, wherein a thickness of said cell thickness adjustment layer is selected so that a height of said second shading region as a whole is greater than a total height of said coloring layers and said overcoat layer contained in said first shading region.

5. The substrate for a liquid crystal panel as defined in claim 3, wherein said second shading region further includes a color filter layer, and a thickness T of said cell thickness adjustment layer is given by the following equation wherein a layer height of each of said coloring layers in said first and second shading layers is m, a layer thickness of said overcoat layers in said first and second shading regions is n and a layer height of said color filter layer in said second shading region is:

$$T=(3m+n)-(s+2m+n/2).$$

6. The substrate for a liquid crystal panel as defined in claim 3, wherein said cell thickness adjustment layer further comprises a transparent resin that is the same as the transparent resin of said overcoat layer.

7. A liquid crystal display panel including said substrate for a liquid crystal panel as defined in claim 1.

8. An electronic apparatus including said liquid crystal display panel as defined in claim 7 as a display portion.

9. A method of producing a substrate for a liquid crystal panel comprising:
a first step of forming a first shading region defining an outer edge of a display region on a substrate;
a second step of forming a cell thickness adjustment layer on said substrate inside said display region; and
a third step of forming a second shading region on said cell thickness adjustment layer and defining boundaries of a plurality of pixel regions inside said display region;
wherein a thickness of said cell thickness adjustment layer is selected so that a height of said second shading region as a whole is not less than a height of said first shading region as a whole;
wherein said first step forms said first shading region by serially laminating coloring layers of a plurality of colors and an overcoat layer; and
wherein said third step forms said second shading region by serially laminating coloring layers of a plurality of colors and an overcoat layer.

10. A method of producing a substrate for a liquid crystal panel as defined in claim 9, wherein said cell thickness adjustment layer is formed of a transparent resin in said second step.

11. A method of producing a substrate for a liquid crystal panel as defined in claim 9, wherein said first and second steps form said coloring layers of said plurality of colors and said overcoat layers contained in said first and second shading regions by respectively using the same materials.

12. A method of producing a substrate for a liquid crystal panel as defined in claim 11, wherein a thickness of said cell thickness adjustment layer is selected so that a height of said second shading region as a whole is greater than a total height of said coloring layers and said overcoat layer contained in said first shading region.

13. A method of producing a substrate for a liquid crystal panel as defined in claim 11, wherein said third step forms a color filter layer on said cell thickness adjustment layer before said coloring layer of each color is formed, and a thickness T of said cell thickness adjustment layer is given by the following equation wherein a layer height of each of said coloring layers in said first and second shading regions is m, a layer thickness of said overcoat layers in said first and second shading regions is n and a layer height of said color filter layer in said second shading region is:

$$T=(3m+n)-(s+2m+n/2).$$

14. A method of producing a substrate for a liquid crystal panel as defined in claim 11, wherein said cell thickness adjustment layer is formed of the same transparent resin as that of said overcoat layer.

15. A substrate for a liquid crystal panel comprising:

a substrate;

a first shading region arranged on said substrate and defining an outer edge of a display region;

a cell thickness adjustment layer arranged on said substrate inside said display region; and a second shading region arranged on said cell thickness adjustment layer and defining boundaries of a plurality of pixel regions inside said display region;

wherein a thickness of said cell thickness adjustment layer is selected so that a height of said second shading region as a whole is not less than a height of said first shading layer as a whole;

wherein said first shading region includes a superposition of coloring layers of a plurality of colors and an overcoat layer;

wherein said second shading region includes a superposition of coloring layers of a plurality of colors and an overcoat layer; and wherein a thickness of said second shading layer is less than said first shading layer.

16. The substrate for a liquid crystal panel of claim 15, wherein said first shading layer and said second shading layer are formed simultaneously.

17. A substrate for a liquid crystal panel comprising:

a substrate;

a first shading region arranged on said substrate and defining an outer edge of a display region;

a cell thickness adjustment layer arranged on said substrate inside said display region; and a second shading region arranged on said cell thickness adjustment layer and defining boundaries of a plurality of pixel regions inside said display region;

wherein a thickness of said cell thickness adjustment layer equals the difference in height between said second shading region as a whole and said first shading layer as a whole;

wherein said first shading region includes a superposition of coloring layers of a plurality of colors and an overcoat layer; and wherein said second shading region includes a superposition of coloring layers of a plurality of colors and an overcoat layer.

* * * * *